(12) United States Patent
St Clair (10) Patent No.: US 11,837,115 B1
(45) Date of Patent: Dec. 5, 2023

(54) HANDS-FREE IDENTIFICATION AND INFORMATION HOLDER AND DISPLAY

(71) Applicant: Kimberly St Clair, Ballwin, MO (US)

(72) Inventor: Kimberly St Clair, Ballwin, MO (US)

( * ) Notice: Subject to any disclaimer, the term of this patent is extended or adjusted under 35 U.S.C. 154(b) by 0 days.

(21) Appl. No.: 17/866,202

(22) Filed: Jul. 15, 2022

Related U.S. Application Data (60) Provisional application No. 63/222,760, filed on Jul. 16, 2021.

(51) Int. Cl.
*G09F 3/20* (2006.01)
*B60R 7/04* (2006.01)

(52) U.S. Cl.
CPC ............. *G09F 3/203* (2013.01); *B60R 7/046* (2013.01)

(58) Field of Classification Search
CPC . G09F 3/203; G09F 2007/1865; B60R 7/046; B60R 13/105; A45C 2001/065
USPC .......................................................... D3/247
See application file for complete search history.

(56) References Cited

U.S. PATENT DOCUMENTS

| | | | |
|---|---|---|---|
| 4,722,376 A | 2/1988 | Rhhyner | |
| 4,889,268 A | 12/1989 | Shubeck | |
| D344,182 S * | 2/1994 | Guzman-Rosario | ........... D3/247 |
| D460,119 S | 7/2002 | Tomai | |
| 6,751,805 B1 | 6/2004 | Austion | |
| 6,766,932 B2 | 7/2004 | Hansen et al. | |
| 8,245,423 B2 | 8/2012 | Goslee | |
| D831,955 S * | 10/2018 | Brandt | ............................ D3/247 |
| 10,093,244 B1 | 10/2018 | Brown | |
| 10,654,309 B1 | 5/2020 | Baston | |
| 10,766,436 B2 * | 9/2020 | Simmons | ................ B60R 13/10 |
| 2002/0179475 A1 * | 12/2002 | Kohana | ................ A45C 11/182 229/928 |
| 2004/0079015 A1 * | 4/2004 | Tuttle | ..................... G09F 3/203 40/661 |
| 2007/0107287 A1 * | 5/2007 | Huang | ..................... G09F 21/04 40/611.1 |
| 2014/0373987 A1 | 12/2014 | Ming | |
| 2015/0305454 A1 * | 10/2015 | Bennett | ..................... A45C 1/06 206/37 |
| 2017/0039897 A1 * | 2/2017 | Simmons | ............. A45C 11/182 |
| 2018/0025675 A1 | 1/2018 | Sparks | |
| 2018/0084884 A1 * | 3/2018 | Draper | ..................... A45C 1/06 |
| 2018/0151093 A1 * | 5/2018 | Willis | ..................... G09F 3/203 |
| 2019/0077325 A1 | 3/2019 | Boukari et al. | |
| 2020/0135069 A1 | 4/2020 | Benjamin-Guillory | |
| 2020/0238927 A1 * | 7/2020 | Simmons | ................ B60R 13/10 |
| 2021/0362656 A1 * | 11/2021 | Harbin | ..................... B42F 7/025 |

FOREIGN PATENT DOCUMENTS

GB     2395053     12/2004

OTHER PUBLICATIONS

"Custom QR Code Wallet," https://web.archive.org/web/20201019212347/https://www.carbonklip.com/products/custom-qr-code-wallet (Year: 2020).*

* cited by examiner

*Primary Examiner* — Gary C Hoge
(74) *Attorney, Agent, or Firm* — John Rizvi; John Rizvi, P.A.—The Patent Professor®

(57) ABSTRACT

A hands-free identification and information holder and display for traffic stops. The display is configured for removable affixation to a vehicle door or window. The information on the display is made for audio and visual ease for reception of information by law enforcement in a traffic stop.

16 Claims, 9 Drawing Sheets

HANDS-FREE IDENTIFICATION AND INFORMATION HOLDER AND DISPLAY

CROSS-REFERENCE TO RELATED APPLICATION

This application claims the benefit of U.S. Provisional Patent Application 63/222,760, filed Jul. 16, 2021, which is hereby incorporated by reference herein in its entirety.

FIELD OF THE INVENTION

The present disclosure relates generally to an information holder and display, and more particularly, to a hands-free identification and information holder and display which can be attached to a vehicle to provide information to law enforcement during a traffic stop.

BACKGROUND OF THE DISCLOSURE

Traffic stops, commonly referred to as being pulled over, occur when, a member of law enforcement or medical professional, conduct a temporary detention or routine stop of a vehicle. These stops are often conducted to investigate a possible crime or incident of the vehicle's driver or one of the passengers. For example, the detention of a vehicle can occur when a driver is believed to have violated a traffic law or ordinance and/or if that driver requires medical attention from an accidental collision of their vehicle. These common scenarios take place frequently and, in each scenario, information must be presented to the respective officer that initiated the detention.

The information typically presented to the law enforcement or medical professional generally comprise a form of identification and proof of legally operating a vehicle such as a driver's license, the insurance information for the passenger associated with the vehicle, the registration to prove ownership of the vehicle and if necessary, any medical history or medical card will be presented.

In order to present the routine information, the officer must walk over to the driver's vehicle and request such information face to face. The driver must open their window and is then signaled in some way to retrieve such information from inside their vehicle. The information may be contained in a wallet, any of the compartments of the vehicle, the back seat, or anywhere else in the vehicle. The contents of those compartments are unknown to the officer and may comprise a needle, a firearm, knife, or alternative dangerous weapon.

Initiating a traffic stop can be a tense and hostile situation for both the conducting officer and the vehicle passenger. Both parties are unfamiliar with the other and this creates a high-level risk without control. Traffic stops are known to be inherently dangerous, risky, and pose a significant threat to the physical safety of law enforcement officers and vehicle passengers. It is not an uncommon occurrence for a routine traffic stop to escalate into a violent confrontation. Many officers, drivers and passengers have been assaulted, severely injured, and even killed.

Ideally, it would be extremely useful to be able to create a safer environment and less hostile situation for traffic stops by reducing the level of steps needed to request and present such information. However, police confrontation in order to retrieve driver information is still necessary to conduct a proper investigation during detention.

There are different methods on the market for alleviating the dangers and control of such confrontation in traffic stops, however they fail to create a convenient, functional, multi-purpose and safe solution to the dangers of traffic stops. The current preventative methods for traffic stops do not encompass the totality of information required by an officer. Identification holders simply hold information related to the identity of the passenger and devices for communication are limited to certain groups of individuals. No such method exists for the conveyance of medical information and medical background necessity of a driver during the traffic stop, which can create a grave risk depending on the medical needs of the driver.

Accordingly, there is need for a solution to at least one of the aforementioned problems. For instance, there is an established need for a preferably multi-purpose display of information that imparts visibility, convenience, and an all-encompassing audio and visual experience for the parties of a traffic stop, and yet does not require the use of certain levels of communication or a need for physical action in retrieval.

SUMMARY OF THE INVENTION

The present device is directed to a hands-free identification and information holder and display (also called device or apparatus) which can be attached to a vehicle's door or window. The multi-purpose hands-free identification and information holder and display may be configured to comprise a means of discreetly concealing the material stored within. A vehicle window may removably engage the identification and information holder and display and secure the device in place on a vehicle, removing the need for a person to physically hand over information to law enforcement. Law enforcement can collect the information it needs from the driver without the driver needing to have his or her window or door open. The identification and information holder and display may be removably engaged or affixed to a door of a vehicle to hold the device in place during a traffic stop. The identification and information holder and display device may be located on the door, window, or body of a vehicle and the identification and/or information held in the holder and display can be easily viewed. Audio may be projected from the identification and information holder and display to allow law enforcement to hear recorded information.

In at least one embodiment of the present disclosure, the hands-free identification and information holder and display comprises a base having a border, a frontal portion, and an opposite backside portion. On the base the frontal portion is comprised of a plurality of separately adjacent pockets. The pockets can be made transparent and comprise an open end on the pocket's perimeter for ease of access into or out of the pocket. The pockets can hold identification cards, such as a driver's license, insurance card, medical information, or any informational cards or papers to be presented to law enforcement. The center vicinity of the base is met by a fold and the bottom portion of the frontal portion comprises a separate elongated wallet along the center vicinity of the base and behind the lower end pockets of the frontal portion. The separate pocket comprises an open end for ease of access and storage. The upper most end of the base's border comprises of a flap. The flap can crease or fold at the border of the base and can be made to be flipped on either the frontal portion or back sided portion of the base. At least one securing object can be located in the flap. The flap comprises a camera that can be centrally located in the flap and below the securing object. An audio output device, such as a speaker, can be located below the camera. The audio output device can be turned on or off by depressing a depressible button to play or stop audio. The flap can also comprise a light emitting source, such as an LED light, a scannable object is printed onto the flap, and a visual output device, such as an LED screen for visually displaying information.

In another aspect, the base can be formed along a separate fold or axis aside from the central vicinity of the device, holding a different shape of its border and two-sided portions adjacent to the frontal and back sided portions.

In another aspect, the frontal portion and the pockets can be made on one side of the base and to comprise more or less pockets for information storage.

In another aspect, the frontal portion may comprise all the features of the back sided portion.

In another aspect, the back sided portion may comprise all the features of the frontal portion.

In another aspect, the open end of the pockets may be located on any end of the pocket, and each pocket may comprise more than one open end for ease of access and use.

In another aspect, the flap may be located at the lowest most end of the base's border and can be made to only flip to either the back sided portion or the frontal portion, therein the base may contain a plurality of flaps on the border on any side.

In another aspect, the securing object can be placed on the center of the base in order to secure the device to a vehicle's door, wherein the securing object would be concealed inside of the base behind the pockets.

In another aspect, the camera can be located on the frontal portion of the base between the pockets of the frontal portion.

In another aspect, the audio output device can be located on the frontal portion of the base between the pockets of the frontal portion.

In another aspect, the play/stop depressible button can be located on the frontal portion of the base between the pockets of the frontal portion.

In another aspect, the light output can be located on the frontal portion of the base between the pockets of the frontal portion.

In another aspect, the scannable object can be located on the frontal portion of the base between the pockets of the frontal portion.

In another aspect, the visual display can be located on the frontal portion of the base between the pockets of the frontal portion.

In another aspect, the information for the insurance card, driver's license, medical information, and registration card can be aligned on different sides in a separate order of information on the pockets.

In another aspect, the depressible play/stop button can be a switch to turn on and off any of the components for which its intended use is made.

In another aspect, the light output may be an alternative light such as an added reflective material for visibility.

In another aspect, the scannable object may be a bar code or a quick response (QR) code, scannable by phone for the relevant information.

In another aspect, the display may be secured by a magnetized strip to the vehicle door, a hook for the window, a clamp for securing in the same manner, a reusable temporary adhesive, or a suction cup for securing onto any solid available source of the vehicle.

In another aspect, the transparent pockets may be opened outward using a hinge, for access to the intended vehicle driver's information.

These and other objects, features, and advantages of the present invention will become more readily apparent from the attached drawings and the detailed description of the preferred embodiment, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a hands-free identification and information holder and display, which can be attached to a vehicle to allow law enforcement to receive and review identification and information required from a driver during a traffic stop without the driver needing to have the automobile window in a down position to provide said identification and information.

Referring initially to FIGS. 1-8, a hands-free identification and information holder and display, hereinafter also referred to as the "display" 100 or "device" 100 or "apparatus" 100, is illustrated in accordance with a first exemplary embodiment of the present invention. As shown for instance in FIG. 1, the isometric frontal view, the display 100 comprises a base 102. In some embodiments, the base 102 may comprise a frontal portion 104, a back sided portion 106 (see FIG. 2), a border 108, and a flap 110. A pocket 112 surfaces through the frontal portion 104 and a plurality of side-opening pockets 114 can be affixed to the frontal portion 104. The plurality of side-opening pockets 114 can be used to display driver's license information, insurance information, registration information, and emergency medical information. A tabbed pocket 116 can be located towards the bottom of the frontal portion 104 and comprise tabs 117. The side-opening pockets 114 can be designed in this fashion to maximize efficient and ease of access and can be orientated in a different position for the same result. The pocket 112, plurality of side opening pockets 114, and tabbed pocket 116 can also receive a citation or information from a law enforcement officer to be given to the driver of the vehicle.

Figure 1:
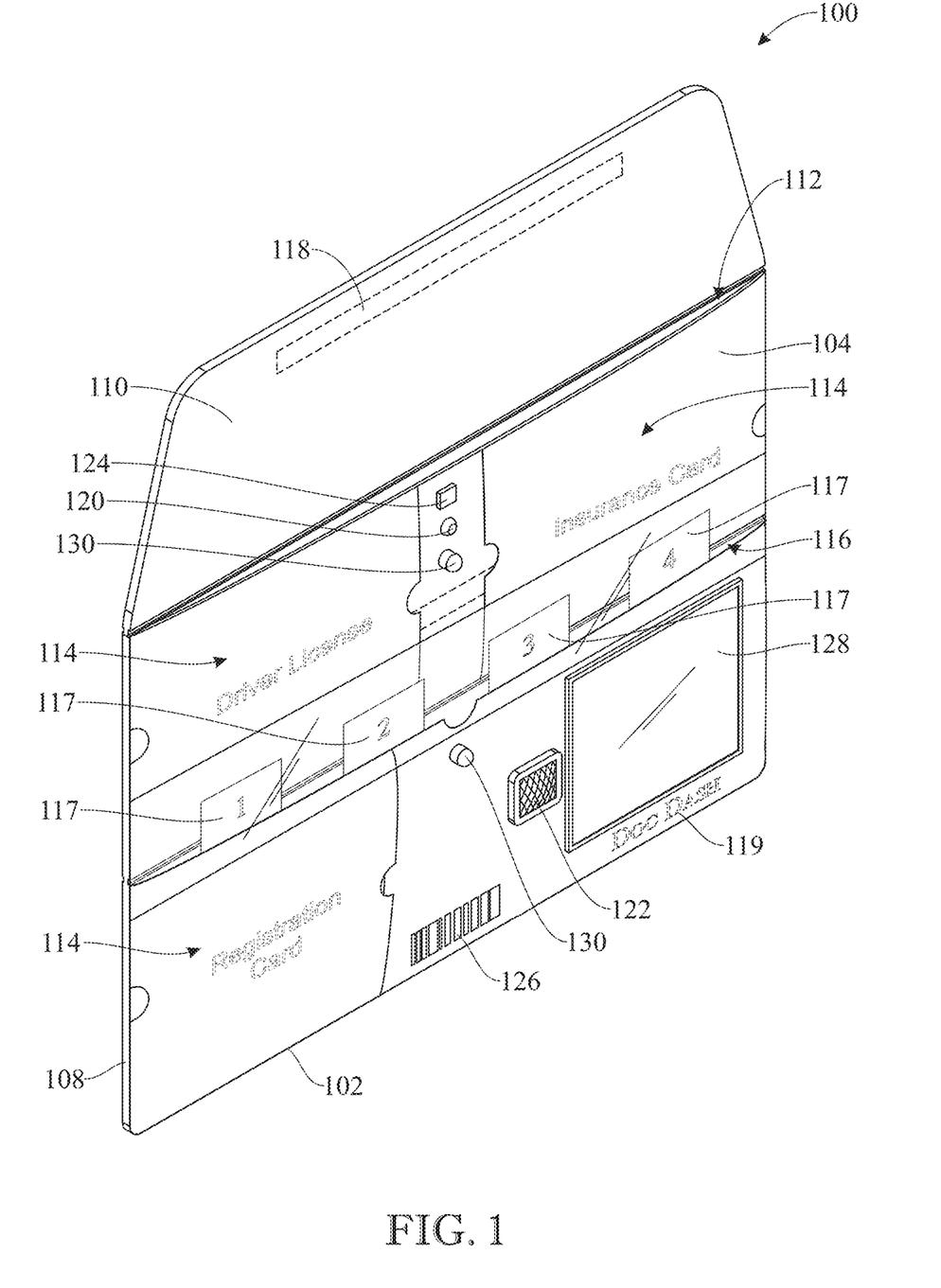
FIG. 1 presents an isometric frontal view of the base of the display, the frontal portion, border, the flap, the camera, the securing object, the play/stop button, the LED light, the LED screen, the scannable object, the audio output device, the pockets and the separate elongated wallet, in accordance with the illustrative embodiment of the present device.

Referring to FIG. 1, the isometric frontal view, the flap 110 extending upward on the upper most side of the frontal portion 104 and connected to the border 108 comprises: a securing object 118 for securing the display onto a vehicle door, in some embodiment the display 100 may comprise a magnetized material, a suction cup for securing onto a window, a hook for securing onto the window or an open window door ledge, a temporary adhesive, wherein the temporary adhesive can be reused, or a variety of methods for securing the display 100, a camera 120 with video enabled recording, an audio output device 122 being electrically connected to an audio recording device and having the capability of playing back recorded audio, a depressible play/stop button 124, a scannable object 126 (e.g., any machine-readable code, e.g., a scannable object) to scan for information, a visual display 128, such as an LED screen, that displays a message, and at least one optional light source 130, such as an LED light. The audio output device 122 is made ready to playback recorded audio that can comprise the driver's medical information and the playback can be initiated by depressing the depressible play/stop button 124.

The base 102, frontal portion 104, a back sided portion 106, a border 108, and flap 110 may create one continuous object comprising at least one fold (two folds shown), and the display 100 may be folded when stored. The display 100 may be a bi-fold or tri-fold (shown) wallet type device.

Figure 2:
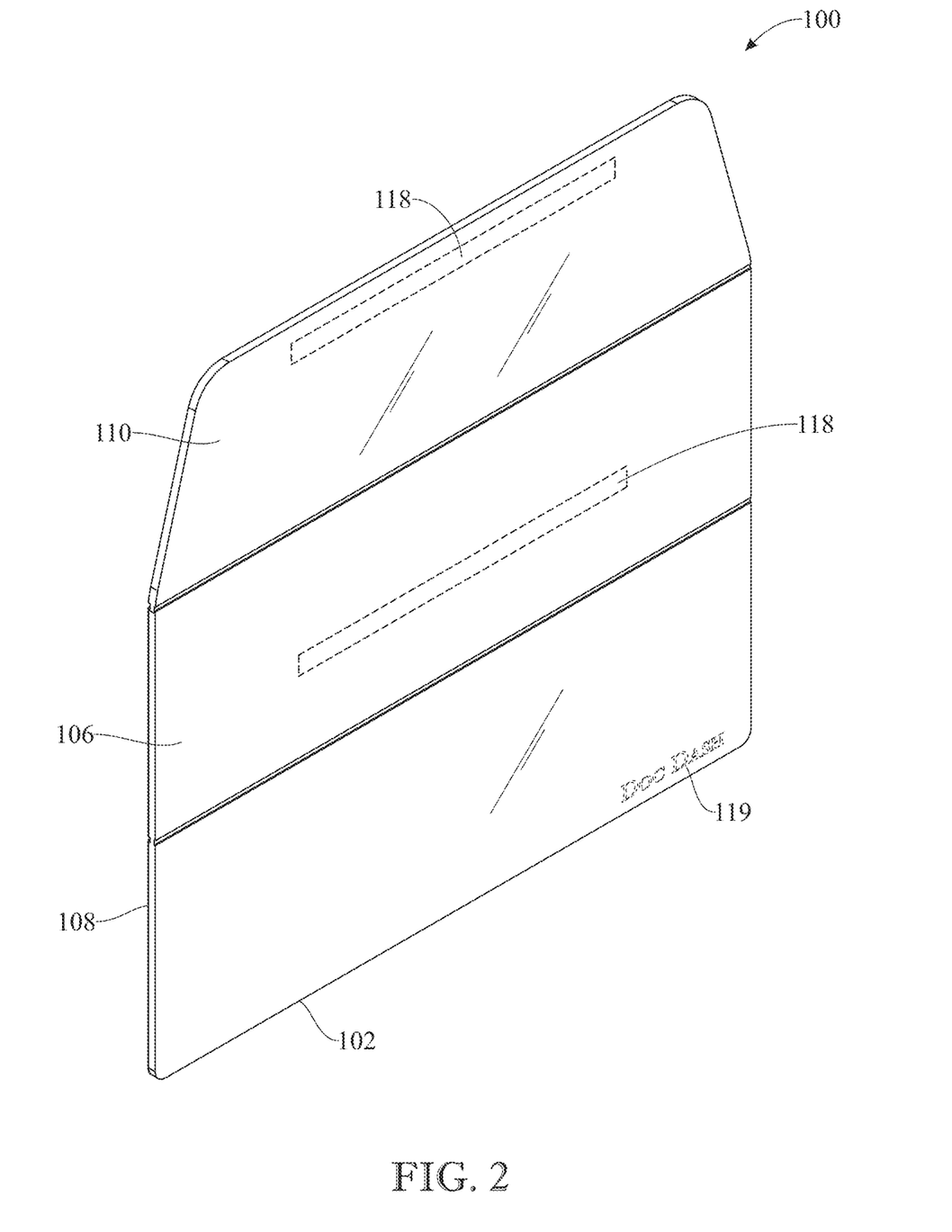
FIG. 2 presents an isometric rearward view of the back sided portion of the base, the flap, and the securing object illustrated in FIG. 1 in accordance with at least one embodiment of the present disclosure.

Referring now to FIG. 2, the isometric rearward view, the back sided portion 106 contains a securing object 118 that may be located inside the flap 110 for and not visible to the exterior of the display 100 or may be located on the outside of the flap for alternative methods of securing the display 100. The securing object is used for securing the display 100 to a vehicle door. In another embodiment, hooks can be used for securing the display 100 to a window and in another embodiment, suction cups are used for securing the display 100 to a window. The securing object may also be a temporary adhesive applied to the flap 110 or other portion or portions of the display 100 in a strip-like manner. The display 100 may also comprise a logo 119 on the front portion 104 and the logo 119 may be made of a reflective material. In an embodiment, the display 100 may be stored inside the vehicle in a fully folded configuration using a docking plate mounted inside the vehicle and onto which the display 100 is secured. In this way, the vehicle's driver may access the display for securing the display 100 to the window in the event of a traffic stop, for example. In this way, the usage and presence of the display 100 will provide for reduced anxiety and fear levels (in both the driver and the law enforcement officer initiating the traffic stop) and bridges any communication gaps and/or circumstances that might be misinterpreted and negatively affect the outcome of the traffic stop.

Still referring to FIG. 2, the isometric rearward view, the flap 110 and the back sided portion 106 contain a plurality of locations to comprise a reflective logo 119 to allow the display 100 to be highly visible when affixed to a vehicle. The display 100 can be removably affixed to a vehicle.

Figure 3:
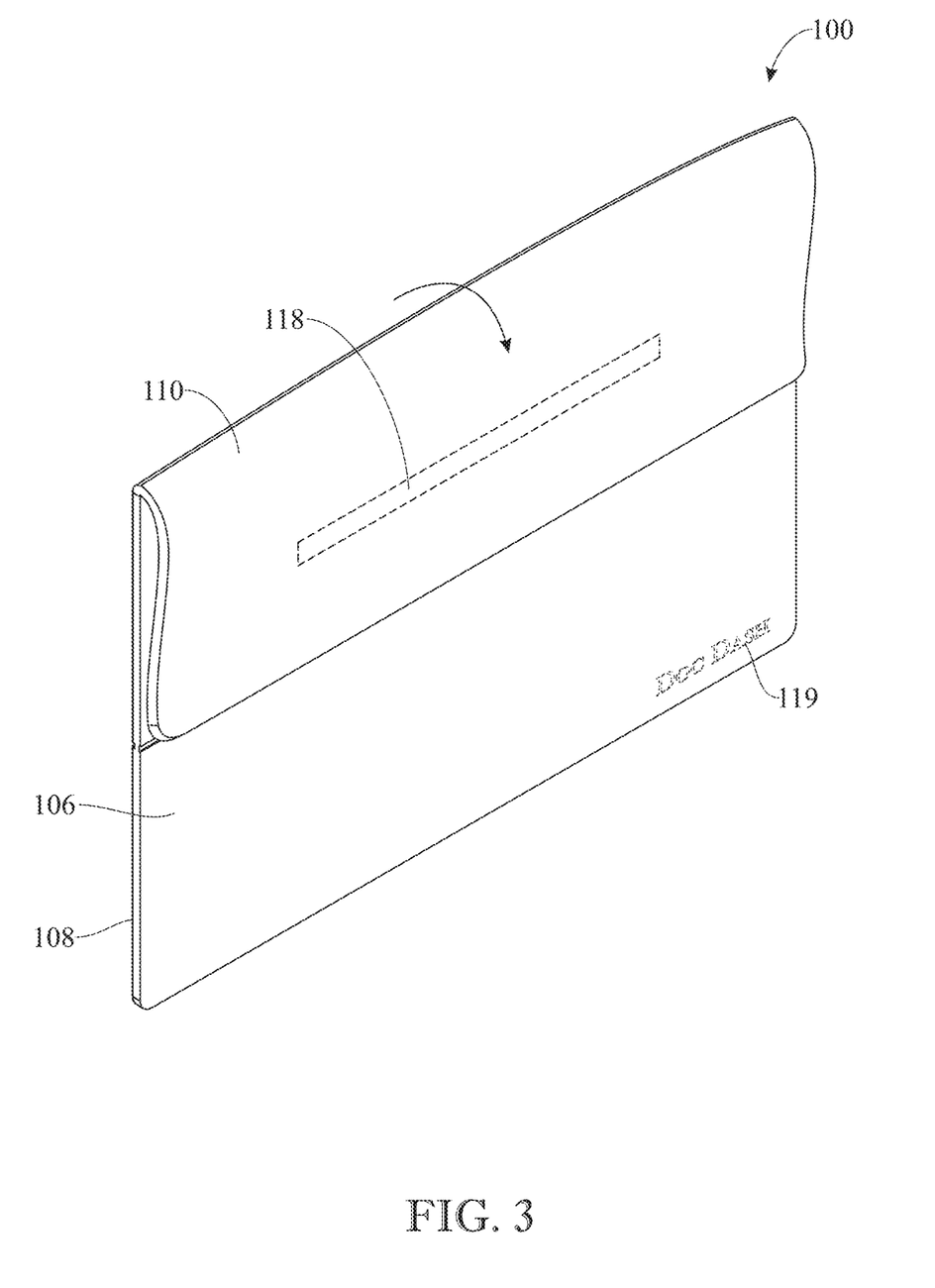
FIG. 3 presents an isometric view of the display with the flap folded against the back of the display in accordance with at least one embodiment of the present disclosure.

As particularly illustrated in FIG. 3, presents an isometric view of the display with the flap folded against the back of the display in accordance with at least one embodiment of the present disclosure. The flap 110 may be folded so that it lies against the back portion 106. The display 100 configured in this manner can be hung on a car window. The securing object 118 located on the flap 118, which may be a magnet, may align with the securing object 118 on the back portion 106 of the device and secure each of the securing objects 118 to each other in a removable or temporary fashion.

Figure 4:
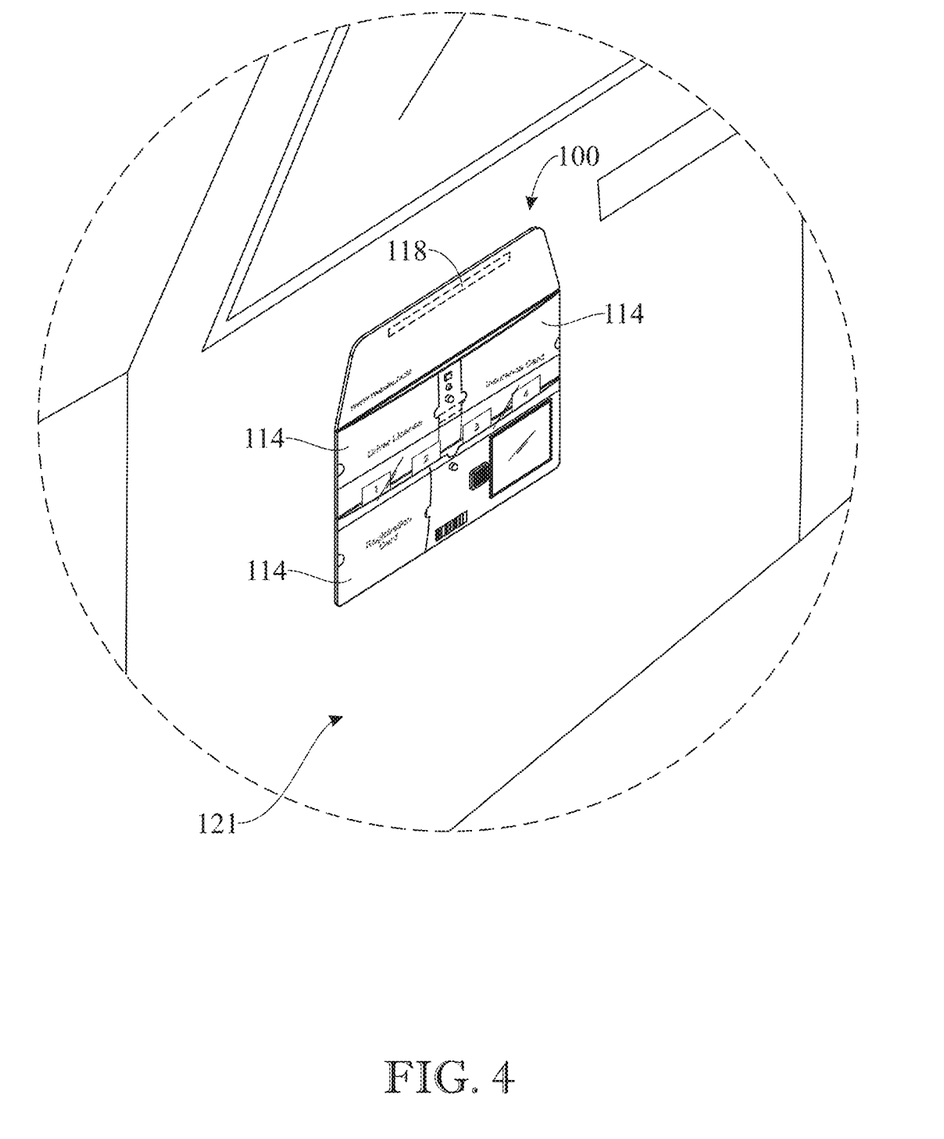
FIG. 4 presents an isometric view of the device in a first position, in which the device is secured onto a vehicle's door in accordance with at least one embodiment of the present disclosure.

Referring now to FIG. 4 the display 100, the frontal portion 104 and the connected flap 110 are illustrated with the elements comprising the display 100 being secured on a vehicle door. The display 100 can be secured onto the driver's side door by at least one securing object 118. A securing object may be located on the flap 110, the rear portion 106, or both. The display 100 may be a plurality of securing objects 118. The flap 110 can be configured in an upright position to allow the securing object 118 on the flap 110 to make contact with the vehicle door of the information and identification contained inside the display 100 to be viewed and accessed. The frontal portion 104 may comprise of a multitude of light outputs (not shown), such as LED lights, concealed behind each side-opening pockets 114 to light the information contained in the pocket and increase ease of visibility of said information contained in each of the side-opening pockets 114 of the display 100. This disclosure is not intended to be limited by the placement of the light outputs. The side-opening pockets 114 can comprise wording or labeling on the front of each pocket to identify what information is contained in the side-opening pockets 114. The labeling can also be placed above or below the side-opening pockets 114 and this disclosure is not intended to be limited by requiring labeling and if labeling is present, where the labeling is located.

Figure 5:
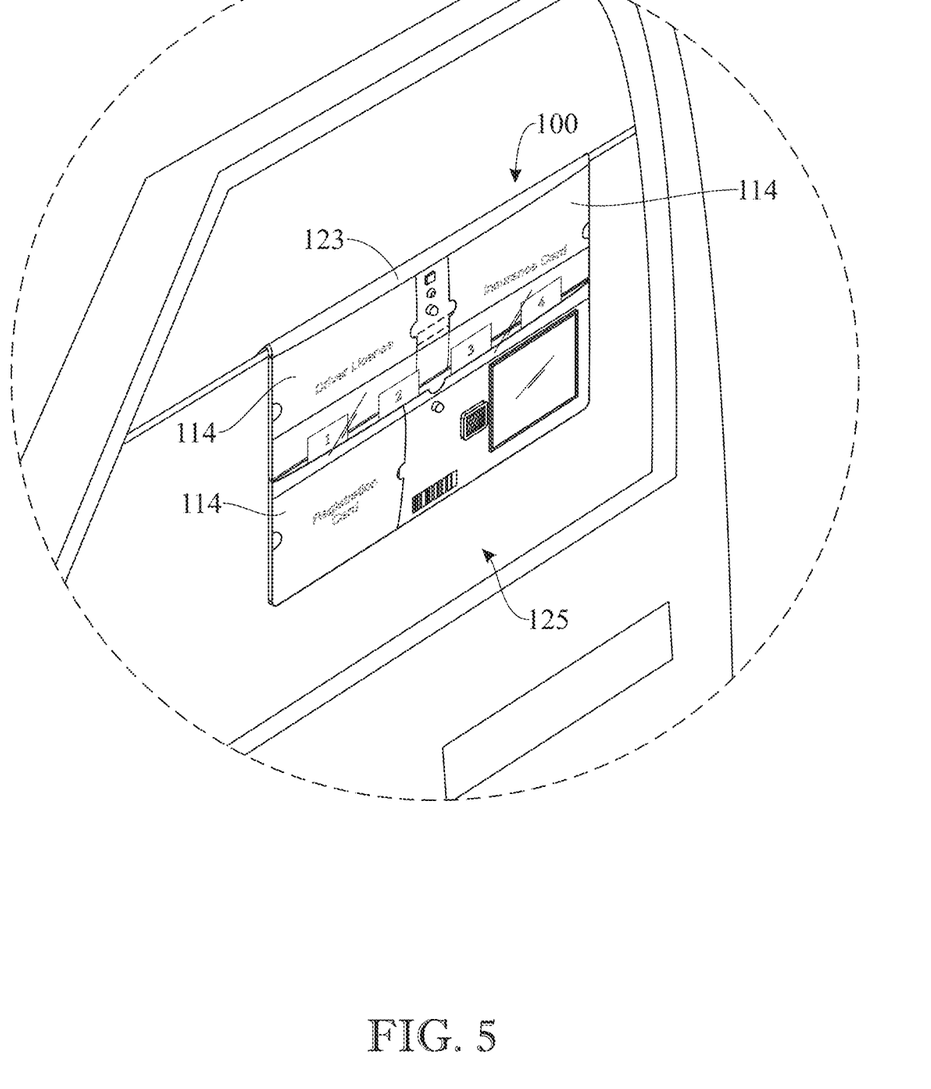
FIG. 5 presents an isometric view of the device in a second position, in which the device is secured onto a vehicle's window in accordance with at least one embodiment of the present disclosure.

As illustrated in FIGS. 5, an isometric view of the device in a second position, the flap 110 is configured in a folded position and the fold 123 lies along the upper most edge of a partially opened window 125 on the vehicle door 121. The flap 110 is being secured, along with the rest of the display, by hooks at the upper most edge of the flap 110. In this embodiment the window may be opened to any degree in order for the fold 123 to secure the display 100 onto the window 125. The display 100 may be secured onto any open enabled window 125 of the vehicle, such as on the passenger side window and the two rear passenger windows. The securing object 118 located on the flap and the securing object 118 located on the rear portion 106 each contact the window to secure the display 100 to the window 125.

Figure 6:
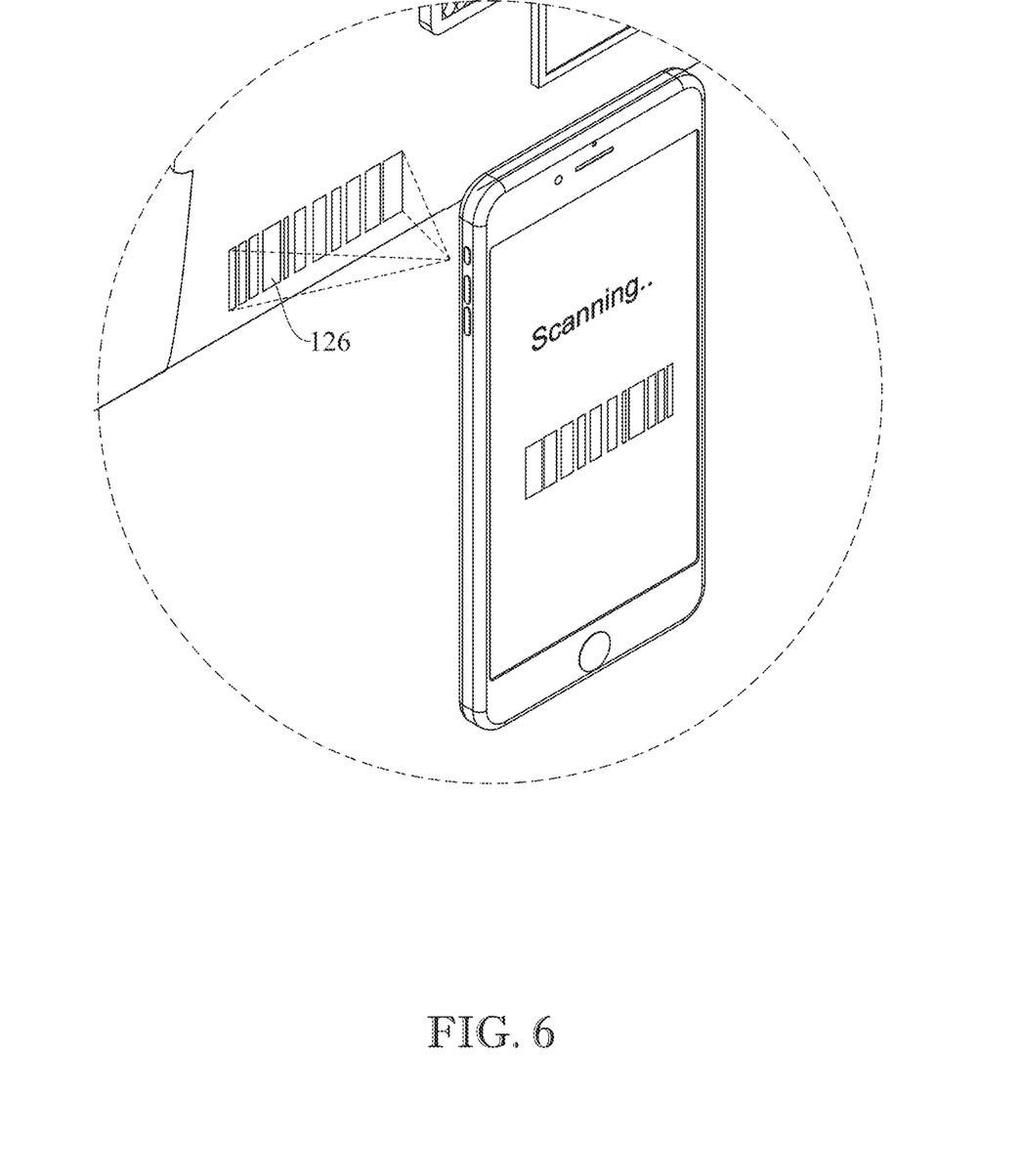
FIG. 6 presents a magnified view of the scannable object, stored with information, scanned by a mobile device in accordance with at least one embodiment of the present disclosure.

Referring now to FIG. 6, an isometric magnified view, the scannable object can be positioned on the front portion 104. At least one light source 130 can be made to illuminate the scannable object 126 to easily scan the scannable object using a scannable object scanner (e.g., a bar code or QR code scanner), such as a mobile device, as seen in FIG. 6.

Figure 7:
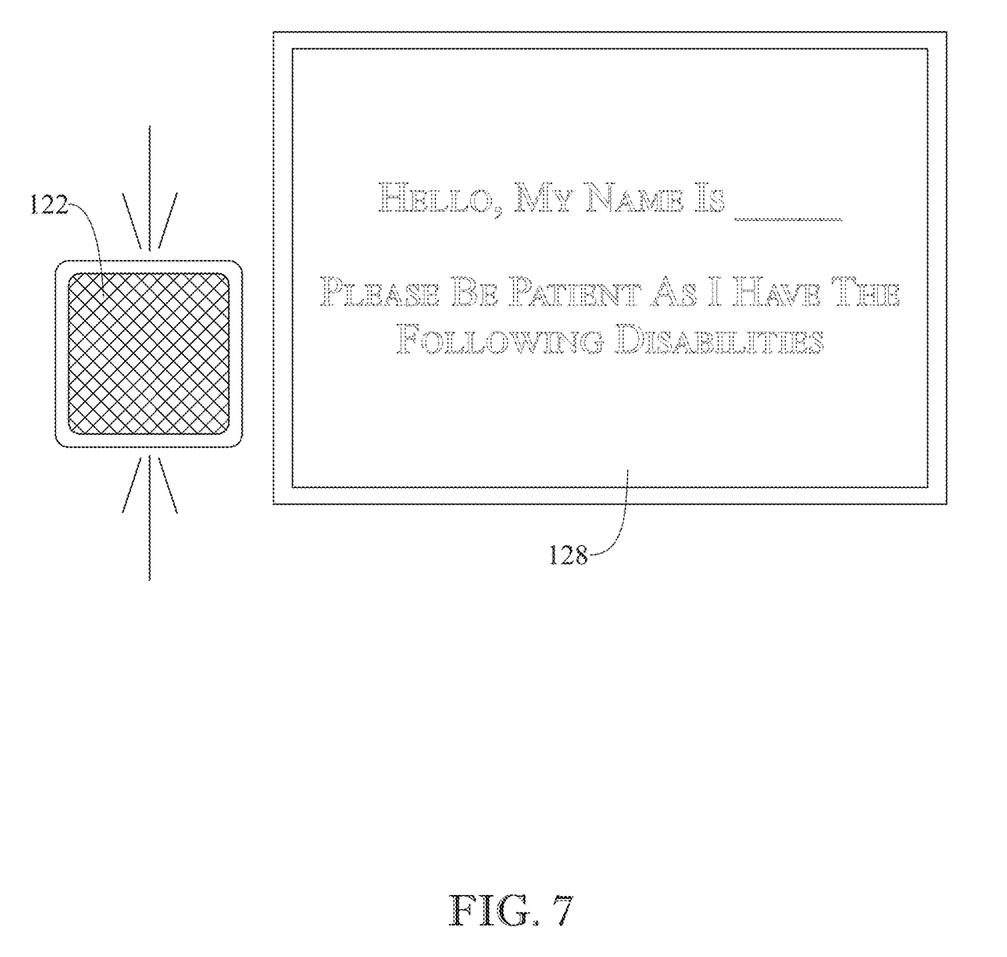
FIG. 7 is a plan view of an audio output device and a visual output device of the display in accordance with at least one embodiment of the present disclosure.

Referring now to FIG. 7, at least one embodiment of the audio output device 122 and the visual display 128 are illustrated. The audio output device 122 outputs audio recorded in the display 100. The visual display 128 displays text that can be prerecorded into the display 100.

Figure 8:
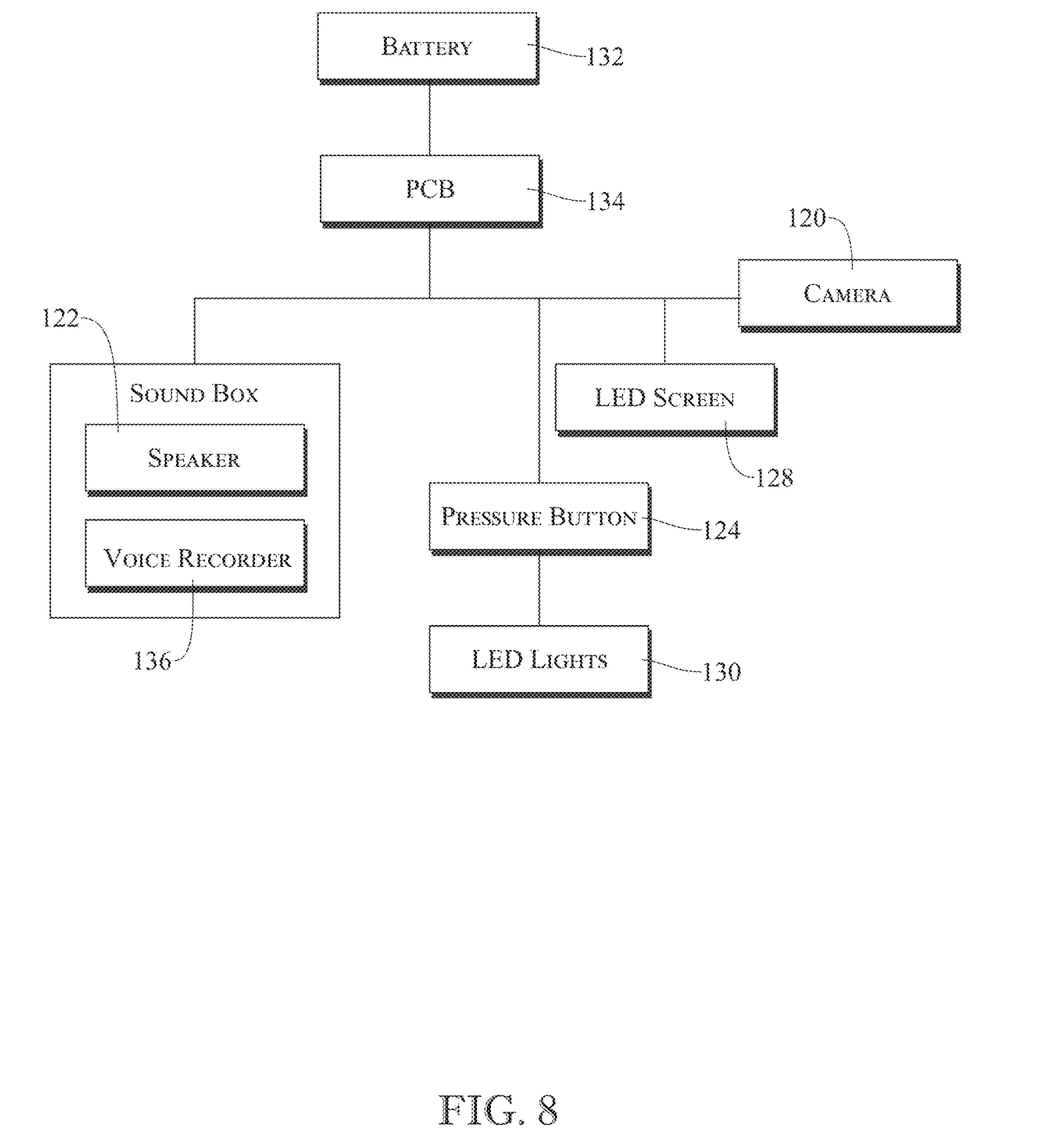
FIG. 8 is a general connectivity diagram view of the battery and the batter powered elements of the device through wiring and circuitry in accordance with at least one embodiment of the present disclosure.

Referring now to FIG. 8, a general connectivity diagram view, the power source 132, such as a battery, is located within the display 100 and is electrically connected to all electrical components housed in the display 100. A printed circuit board (PCB) 134 may be electrically connected to the power source 132 and all components may be in communication with the printed circuit board 134 prior to connecting to the power source 132. The power source 132 and the PCB 134 can be in electrical communication with a visual display 128, such as a LED screen, as well as the light source 130 (e.g., LED lights), audio output device 122 (e.g., an audio speaker). The audio output device 122 enables audio to be outputted from an audio input device 136, such as a voice recorder, that enables audio recording. Of course, the audio input device 134 and the audio output device 122 may be separate device or integrated into a single device. A depressible play/stop button 124, such as a pressure button, controls the power source 132. When the depressible play/stop button 124 is depressed, power from the power source 132 is allowed to flow through the display 100 to power the camera 120, visual display 128, light source 130, audio output device 122, audio input device 136, and any other electrical component housed in the display 100. The display 100 will comprise wiring, circuit boards, memory devices, and other components necessary to allow the electrical components to operate as intended. The display 100 may also comprise means for allowing programs to be stored, such programs that can control the time the visual display 128 is turned on, the number of times the audio output device 122 repeats the audio information, the length of time the light source 130 or multitude of light sources are light. The depressible activation button 124 will allow electrical current stored in the power source 132 to flow to the components requiring electrical current to operate when the depressible activation button 124 is depressed to turn on the display 100. The depressible activation button 124 will stop electrical current from flowing from the power source 132 to the components requiring electrical current when the depressible activation button 124 is depressed again, turning the display 100 off.

Figure 9:
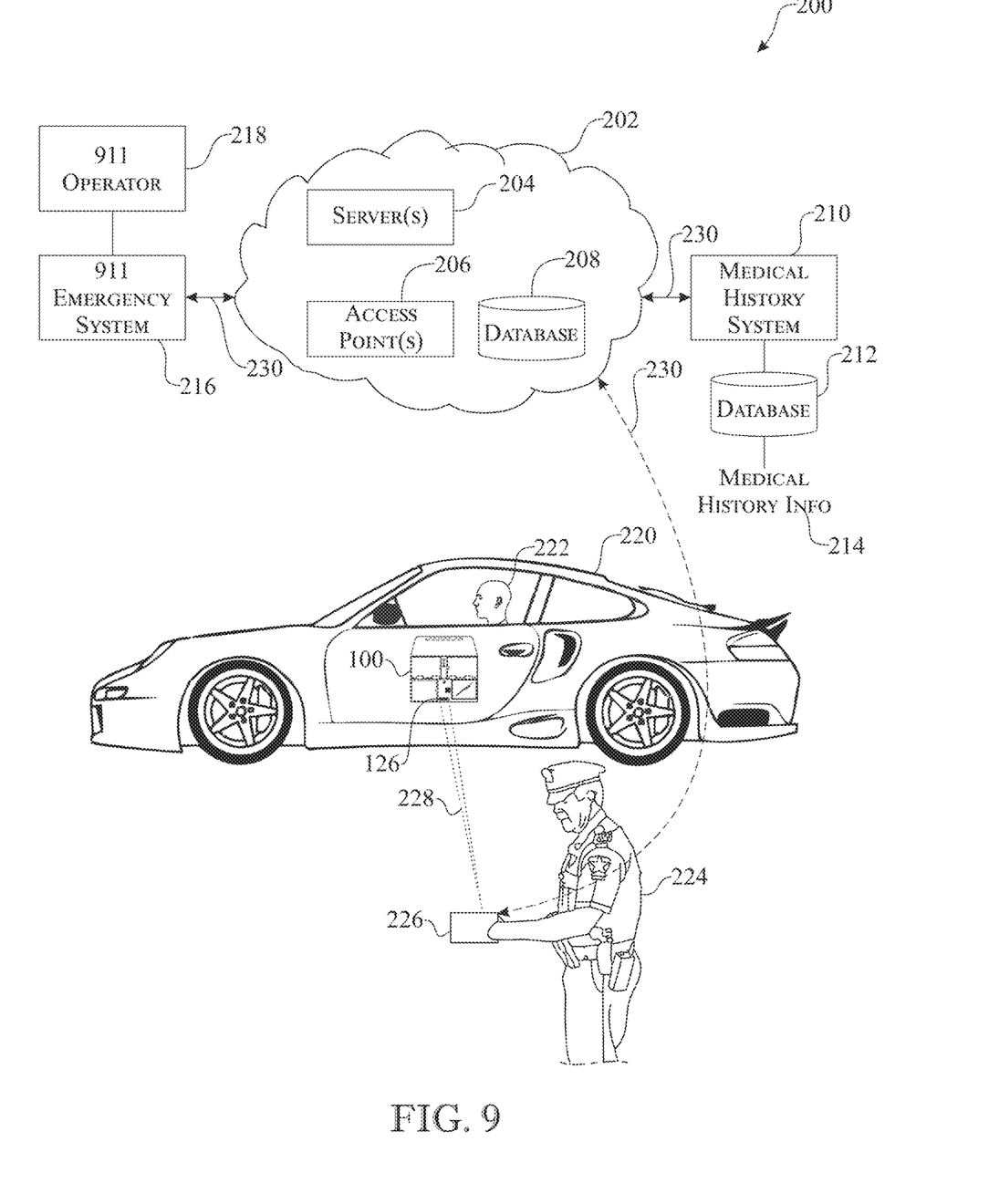
FIG. 9 presents an illustrative use of the hands-free identification and information holder and display during a law enforcement encounter in accordance with at least one embodiment of the present disclosure.

Turning our attention to FIG. 9, presents an illustrative use of the hands-free identification and information holder and display 100 during a law enforcement encounter in accordance with an illustrative embodiment of the present invention. As shown for instance in FIG. 9, a cloud network services architecture 200 includes a cloud 202 comprising at least server(s) 204, access point(s) 206 and database(s) 208. The cloud 202 facilitates the delivery of the user medical records/information triggered through the use of the display 100 as provided by medical history system 210 and database(s) 212 for managing medical history information 214. In an embodiment, the medical records processing, offered by and through the cloud network services architecture 200 and the medical history system 210 will be facilitated by an application executing on user device 226 (e.g., a smartphone as shown in FIG. 4) employed by law enforcement officer 224 (or any other user). The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system.

As noted above, the cloud 202 comprises at least server(s) 204, the access point(s) 206 and the database(s) 208. Cloud, cloud service, cloud server and cloud database are broad terms and are to be given their ordinary and customary meaning to one of ordinary skill in the art and includes, without limitation, any database, data repository or storage media which store content typically associated with and managed by users, medical professionals, hospitals, law enforcement personnel, and first responders, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 226). The cloud server may be implemented in one or more servers and may send and receive content in a various forms and formats, user supplied and/or created information/content and profile/configuration data that may be read from or stored in a cloud database (e.g., the databases 208).

A cloud database may include one or more physical servers, databases or storage devices as dictated by the cloud service's storage requirements. The cloud database may further include one or more well-known databases (e.g., an SQL database) or a fixed content storage system to store content, medical information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools.

The medical history system 210 may comprise one or more processors for executing program code and a communications interface for managing communications to and from the medical history system 210, and data storage devices for storing program code and data. In an embodiment, the communications interface may include a website manager is used to deliver and manage content, data, and other information across one or more websites that may be utilized to access and use the medical history system 210, for example. Further, the operations provided by and through the application executing on the user device 226 (e.g., a smartphone) may be offered through a mobile application and/or a web-based application. The term "website" in the context herein is used in a conventional and broadest sense and is located on at least one server containing web pages stored thereon and is operational in a 24-hour/7-day typical fashion. The medical history system 210 and/or the user device 226 may include location-based services capabilities that facilitate the delivery of location-based services (e.g., global positioning system (GPS) tracking) thereby allowing the medical history system 210 and/or the user device 226 to register the exact location of the law enforcement officer 224. For example, driver 222 may have been involved in a traffic stop of vehicle 220 as shown in FIG. 9.

The data storage devices may also include read-only memory (ROM) or other static storage devices. This may include a data storage device such as a magnetic, optical, or solid-state device and/or a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The communications interface is used to facilitate communications across communications links (e.g., communications links 230). This may take the form, for example, of a wide area network connection that communicatively couples the medical history system 210 with the access points 206 which may be a cellular communications service. Similarly, communications managed by a communications interface may take the form, for example, of a local Wi-Fi network interface or Ethernet interface the communicatively couples the medical history system 210 and/or the user device 226 with the well-known Internet.

The user device 226 may also include one or more communications interfaces for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. Further, illustratively, the communications interface may be a local area network (LAN) card used to provide data communication connectivity to a comparable LAN. Wireless communication links may also be implemented. As will be appreciated, one functionality of the communications interface of the medical history system 210 is to send and receive a variety of signals (e.g., electrical, optical, or other signals) that transmit data streams representing various data types. The user device 226 may also include one or more input/output devices that enable user interaction with the user device 226 (e.g., camera, scanner, reader, display, keyboard, mouse, speakers, microphone, buttons, etc.) For example, the input/output devices may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the law enforcement officer 224 can provide input to the user device 226 or an associated display device, for example.

In this way, in accordance with the embodiment, the display 100 which can be attached to the vehicle 220 to allow the law enforcement officer 224 to receive and review identification and information required from the driver 222 during a traffic stop without the driver 222 having to provide the identification and information in an oral communication with the law enforcement officer 224. This is accomplished, in the embodiment shown, without the driver 222 needing to have the window of the vehicle 220 in a down position. Alternatively, the driver 222 may also attached the display 100 to a rolled-down window as shown in FIG. 5 in accordance with an embodiment. The law enforcement officer 224 will scan 228 the scannable object 126 (e.g., a bar code or QR code) located on the display 100 using the user device 226. This will trigger, illustratively, a communication, over the communications link 230, with the medical history system 212 that will retrieve the respective medical history information 214 stored in the database(s) 212 for the driver 222 and transmit, on behalf of the driver 222, the medical history information 214 directly to the user device 226 of the law enforcement officer 224. Illustratively, the medical history information 214 includes, but is not limited to, information such as past surgeries, present comorbidities, allergies, mental health, preferred hospitals, insurance and emergency contacts. Advantageously, the medical history information 214 provided in real-time such that law enforcement officer 224 may confirm a particular medical condition for the driver 222 and/or administer emergency services in the event the driver 222 is need of such medical attention. In an embodiment, a 911 emergency call to 911 operator 218 on 911 emergency system 216 may also be initiated. In accordance with an embodiment the medical history information 214 may also be transmitted to the 911 operator 918 such that the 911 operator 218 may have access to the patient's medical information at the same time (or instead of) as the law enforcement officer 224. This may save critical time in terms of identifying a course of action and treatment once arriving at the scene and immediately administering to the driver 222.

In some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device comprising:
   a base comprising:
   a flap;
   a border comprising a plurality of edges around the base;
   a frontal portion; and
   a back sided portion, wherein the frontal portion is connected to and displayed outward from the base and the frontal portion is opposite to that of the back sided portion;
   a plurality of separately adjacent pockets affixed to the frontal portion of the base, each separately adjacent pocket comprising at least one open end for access thereto; and
   a securing object connected to the flap for affixing the device to a surface;
   a light source located on the frontal portion of the base;
   a visual display located on the frontal portion of the base;
   an audio input device located on the frontal portion of the base;
   an audio output device located on the frontal portion of the base;
   a camera located on the frontal portion of the base; and
   a power source electrically connected to the light source, the visual display, the audio input device, the audio output device, and the camera.

2. The device of claim 1, wherein the plurality of separately adjacent pockets are transparent and side-opening pockets.

3. The device of claim 2, wherein the plurality of separately adjacent pockets are configured to hold a respective one identification card of a plurality of identification cards.

4. The device of claim 1, wherein the securing object further comprises a magnetized material for securing the device to a metal object.

5. The device of claim 1, wherein the securing object further comprises a suction cup for securing the device to a vehicle window.

6. The device of claim 1, wherein the securing object further comprises a hook for securing the device to an open window door ledge.

7. The device of claim 1, wherein the flap is configured to adopt the following positions selectively and reversibly:
   a first position, in which the flap is in an upright orientation in relation to the base;
   a second position, in which the flap is lowered from the upright orientation in any measurable angle degree toward the back sided portion of the base; and
   a third position, in which the flap is lowered from the upright orientation in any measurable angle degree toward the frontal portion of the base.

8. The device of claim 1, wherein the device further comprises:
   a separate elongated wallet horizontally positioned on the frontal portion of the base, the separate elongated wallet comprising at least one opened portion.

9. The device of claim 1, wherein device further comprises:
   a tabbed pocket horizontally positioned on the frontal portion of the base, the tabbed pocket comprising a plurality of tabs.

10. The device of claim 1, wherein the device further comprises:
    a scannable object located on the frontal portion of the base.

11. The device of claim 10, wherein the scannable object is a bar code or quick response (QR) code configured at least for use in retrieving medical information specific to a user of the device upon the scanning thereof.

12. A device comprising:
    a base comprising:
    a flap;
    a border comprising a plurality of edges around the base;
    a frontal portion; and
    a back sided portion, wherein the frontal portion is connected to and displayed outward from the base and the frontal portion is opposite to that of the back sided portion;
    a plurality of separately adjacent pockets affixed to the frontal portion of the base, each separately adjacent pocket comprising at least one open end for access thereto; and
    a securing object connected to the flap for affixing the device to a surface;
    a light source located on the frontal portion of the base;
    a visual display located on the frontal portion of the base;
    an audio input device located on the frontal portion of the base;
    an audio output device located on the frontal portion of the base;
    a camera located on the frontal portion of the base;
    a power source electrically connected to the light source, the visual display, the audio input device, the audio output device, and the camera; and
    a depressible activation button located on the frontal portion of the base for selectively controlling any one of the light source, the visual display, the audio input, the audio output device, and the camera.

13. The device of claim 12, wherein the flap is configured to adopt the following positions selectively and reversibly:
    a first position, in which the flap is in an upright orientation in relation to the base;

a second position, in which the flap is lowered from the upright orientation in any measurable angle degree toward the back sided portion of the base; and a third position, in which the flap is lowered from the upright orientation in any measurable angle degree toward the frontal portion of the base.

14. The device of claim 12, wherein the securing object further comprises a magnetized material for securing the device to a metal object.

15. The device of claim 12, wherein the device further comprises:

a tabbed pocket horizontally positioned on the frontal portion of the base, the tabbed pocket comprising a plurality of tabs.

16. A device comprising:

a base comprising:
- a flap, wherein the flap is configured to adopt the following positions selectively and reversibly:
  - a first position, in which the flap is in an upright orientation in relation to the base;
  - a second position, in which the flap is lowered from the upright orientation in any measurable angle degree toward the back sided portion of the base; and
  - a third position, in which the flap is lowered from the upright orientation in any measurable angle degree toward the frontal portion of the base;
- a border comprising a plurality of edges around the base;
- a frontal portion; and
- a back sided portion; wherein the frontal portion is connected to and displayed outward from the base and the frontal portion is opposite to that of the back sided portion;

a plurality of separately adjacent pockets affixed to the frontal portion of the base, each separately adjacent pocket comprising at least one open end for access thereto and configured to hold a respective one identification card of a plurality of identification cards, wherein the plurality of separately adjacent pockets are transparent and side-opening pockets and the plurality of identification cards comprises at least one of: a driver's license, an insurance card, and a medical information card;

a separate elongated wallet horizontally positioned on the frontal portion of the base, the separate elongated wallet comprising at least one opened portion;

a tabbed pocket horizontally positioned on the frontal portion of the base, the tabbed pocket comprising a plurality of tabs;

a scannable object located on the frontal portion of the base, wherein the scannable object is a bar code or a quick response (QR) code configured at least for use in retrieving medical information specific to a user of the device upon a scanning thereof;

a securing object connected to the flap for affixing the device to a surface;

a light source located on the frontal portion of the base;

a visual display located on the frontal portion of the base;

an audio input device located on the frontal portion of the base;

an audio output device located on the frontal portion of the base;

a camera located on the frontal portion of the base;

a power source electrically connected to the light source, the visual display, the audio input device, the audio output device, and the camera; and wherein the device when affixed to the surface by the securing object serves as a hands-free identification and information holder and display for at least the plurality of identification cards.

* * * * *